(12) United States Patent
Peeters et al.

(10) Patent No.: US 7,765,441 B2
(45) Date of Patent: *Jul. 27, 2010

(54) METHODS AND SYSTEMS FOR DETECTING SYMBOL ERASURES

(75) Inventors: Miguel Peeters, Woluwe Saint Lambert (BE); Geert Arnout Albert Goris, Heverlee (BE)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/474,312

(22) Filed: Jun. 26, 2006

(65) Prior Publication Data
US 2006/0242478 A1    Oct. 26, 2006

Related U.S. Application Data

(63) Continuation of application No. 10/454,591, filed on Jun. 5, 2003, now Pat. No. 7,080,295.

(60) Provisional application No. 60/422,864, filed on Nov. 1, 2002.

(51) Int. Cl.
*G11C 29/00* (2006.01)

(52) U.S. Cl. ....................... 714/702; 714/704

(58) Field of Classification Search ............... 714/702, 714/704
See application file for complete search history.

(56) References Cited

U.S. PATENT DOCUMENTS

| 3,402,393 | A | * | 9/1968 | Massey | 714/786 |
|---|---|---|---|---|---|
| 3,593,275 | A | | 7/1971 | Pumpe | |
| 5,121,395 | A | | 6/1992 | Millar | |
| 5,563,893 | A | | 10/1996 | Lai | |
| 5,636,253 | A | | 6/1997 | Spruyt | |
| 5,940,430 | A | * | 8/1999 | Love et al. | 375/130 |
| 6,466,905 | B1 | * | 10/2002 | Pappas et al. | 704/227 |
| 6,598,189 | B1 | * | 7/2003 | Zhao et al. | 714/708 |
| 2003/0172328 | A1 | * | 9/2003 | Wyatt et al. | 714/704 |
| 2004/0128605 | A1 | | 7/2004 | Sibecas et al. | |
| 2004/0240529 | A1 | | 12/2004 | Leonard et al. | |
| 2005/0251723 | A1 | | 11/2005 | Ilani | |

OTHER PUBLICATIONS

Blaum, M., "Some Codes that Combine ECC with Modulation", May 1990; IBM Technical Disclosure Bulletin, vol. 32, No. 12; pp. 181-182.

* cited by examiner

*Primary Examiner*—Sam Rizk
(74) *Attorney, Agent, or Firm*—Sterne, Kessler, Goldstein & Fox P.L.L.C.

(57) ABSTRACT

A technique for determining a symbol erasure threshold for a received communication signal containing symbol information begins by performing a first threshold calculation to produce an initial symbol erasure threshold, then performing a first margin calculation to produce an initial symbol erasure margin and then modifying the initial symbol erasure threshold using the initial symbol erasure margin to produce a modified symbol erasure threshold. By then periodically modifying the modified symbol erasure threshold adaptively via updating the symbol erasure threshold and/or symbol erasure margin based on various error quantities, the technique can compensate for time-variant considerations, such as drifting noise levels.

25 Claims, 9 Drawing Sheets

METHODS AND SYSTEMS FOR DETECTING SYMBOL ERASURES

CROSS-REFERENCE TO RELATED APPLICATIONS

This application is a continuation of U.S. Non-Provisional application Ser. No. 10/454,591, filed Jun. 5, 2003, which claims benefit to U.S. Provisional Application No. 60/422,864, filed Nov. 1, 2002, all of which are incorporated by reference in its entirety.

BACKGROUND OF THE INVENTION

1. Field of Invention

This invention relates to methods and systems for detecting erasures in a stream of symbols.

2. Description of Related Art

Generally, digital communication channels have the capacity to transport a stream of digital data at a determinable rate with the caveat that a number of symbols within the data stream will be corrupted. One primary reason behind this data corruption is that communication channels suffer from noise contamination. That is, as data is transported through a given communication channel, any resident noise within the communication channel will contaminate the data stream. As a result, any device receiving the corrupted data will have to compensate for symbol errors that will arise due to this noise contamination.

In order to address this problem, a number of error correction schemes have been devised to detect and correct corrupted symbols. For example, a number of block codes, such as the Reed-Solomon (RS) code and the more general Bose-Chadhuri-Hocquenghem (BCH) code, have been developed to detect and correct multiple symbol errors within a block of data. Yet, it is to be appreciated that there is a limit on the number of symbols that a given correction scheme can address for a given block of coded data, and that the performance of these detection/correction schemes suffers when used with large block lengths.

However, it is well known in the communication arts that if the positions of symbol errors are known a priori, then the error correction capacity of a given RS block of data can be doubled. While the locations of corrupted symbols within a block of data are generally unknown prior to decoding, in some cases it is nonetheless sometimes possible to determine the locations of symbol errors prior to decoding. When symbols are characterized by an unknown error value but a known error location, these symbols are referred to as "erasures". When an erasure is detected, it is advantageous to mark the erasure's location in some manner so that a block decoding device can utilize the additional information in the decoding process.

While there are a number of known techniques used to detect symbol erasures, these techniques still often fail to appropriately mark symbols that can clearly be recognized as erasures. Furthermore, such techniques can also mischaracterize erasures as good data. Accordingly, new techniques to detect symbol erasures are desirable.

SUMMARY OF THE INVENTION

In various embodiments, a technique for determining a symbol erasure threshold for a received signal containing symbol information is disclosed. The technique begins by performing a first threshold calculation to produce an initial symbol erasure base-threshold, then performing a first margin calculation to produce an initial symbol erasure margin and then modifying the initial symbol erasure base-threshold using the initial symbol erasure margin to produce a modified symbol erasure threshold.

By modifying a symbol erasure threshold to have a margin other than 0 db, the present invention avoids missing the detection of an excessive number of erasures resulting from burst errors that would be mischaracterized by previously known devices. Furthermore, by making the modified symbol erasure threshold adaptive by periodically updating the symbol erasure base-threshold and/or symbol erasure margin based on various error quantities, the present invention further avoids mischaracterizing symbol erasures due to time-variant noise considerations. Others features and advantages will become apparent from the following figures and descriptions of various embodiments.

DESCRIPTION OF THE DRAWINGS

The invention is described in detail with regard to the following figures, wherein like numerals reference like elements, and wherein.

DETAILED DESCRIPTION OF PREFERRED EMBODIMENTS

Figure 1:
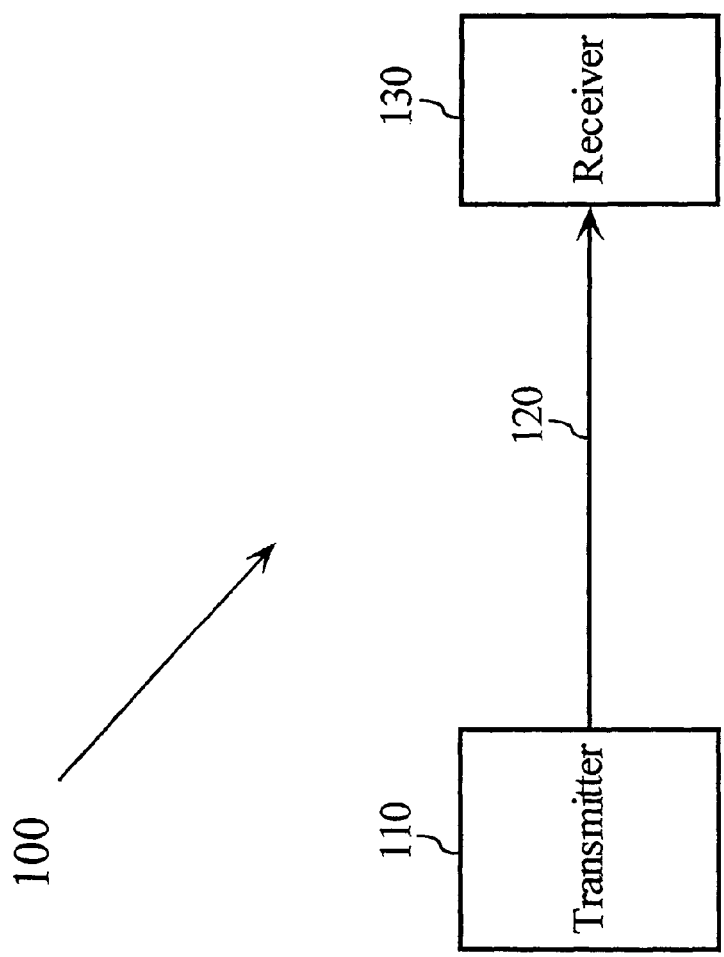
FIG. 1 is a block diagram of an exemplary communication system with which the invention may be implemented.

FIG. 1 is a block diagram of an exemplary communication system 100 according to the present invention. As shown in FIG. 1, the communication system 100 includes a transmitter 110, a communication channel 120 and a receiver 130. In operation, the transmitter 110 can provide a communication signal that contains a stream of digital symbols to the communication channel 120. The communication channel 120 in turn can receive the transmitted communication signal and effectively convey the energy of the communication signal to the receiver 130. Once the receiver 130 has received the communication signal, the receiver 130 can extract the symbol information from the received signal and provide the extracted symbol information to an external device (not shown).

The exemplary communication system 100 is an Asymmetric Digital Subscriber's Line (ADSL) type system designed according to the American National Standards Institute (ANSI) T1.413 standard and the ITU-T G.992.1 recommendation. As such, the exemplary transmitter 110 can be an ADSL-type transmitter capable of transmitting a Discrete Multi-tone (DMT) signal modulated according to a Quadrature Amplitude Modulated (QAM) paradigm. Similarly, the exemplary receiver 130 can be an ADSL-type receiver and the communication channel 120 can be one or more twisted-wire pairs.

However, in various embodiments, it should be appreciated that as communications systems differ, the transmitter 110 can also differ to be any one of a number of different transmission sources, such as a wireless RF transmitter, a transmission system employing wires, a transmitter adapted for transmitting across a coaxial cable, an optical transmitter, a transmitter configured to transmit across a network, such as a telephone network or the Internet, a sonic transmitter or any other known or later developed device suitable for transmitting information without departing from the spirit and scope of the present invention. Further, the nature of the communications system 100 may differ, the nature of the transmitted communication signal can vary accordingly to encompass any known or later developed communication paradigm without departing from the spirit and scope of the present invention.

Similarly, it should be appreciated that the receiver 130 can also differ to be any one of a number of different receiving devices, such as a wireless receiver, a reception system employing wires, a receiver adapted to receive signals from a coaxial cable, a receiver adapted to receive signals from a network, an optical receiver, a fiber optic receiver, a sonic receiver or any other known or later developed device suitable for receiving information without departing from the spirit and scope of the present invention.

Further, as the forms of the transmitter 110 and receiver 130 vary, it should be appreciated that the form of the communication channel 120 can vary accordingly. That is, in various embodiments, the transmission path 130 can be a wireless link, a wired link, such as a twisted-wire pair or coax cable, an optical link, a sonic link or any other known or later developed combination of systems, conduits and devices capable of conveying information from a first location to a second location without departing from the spirit and scope of the present invention.

Figure 2:
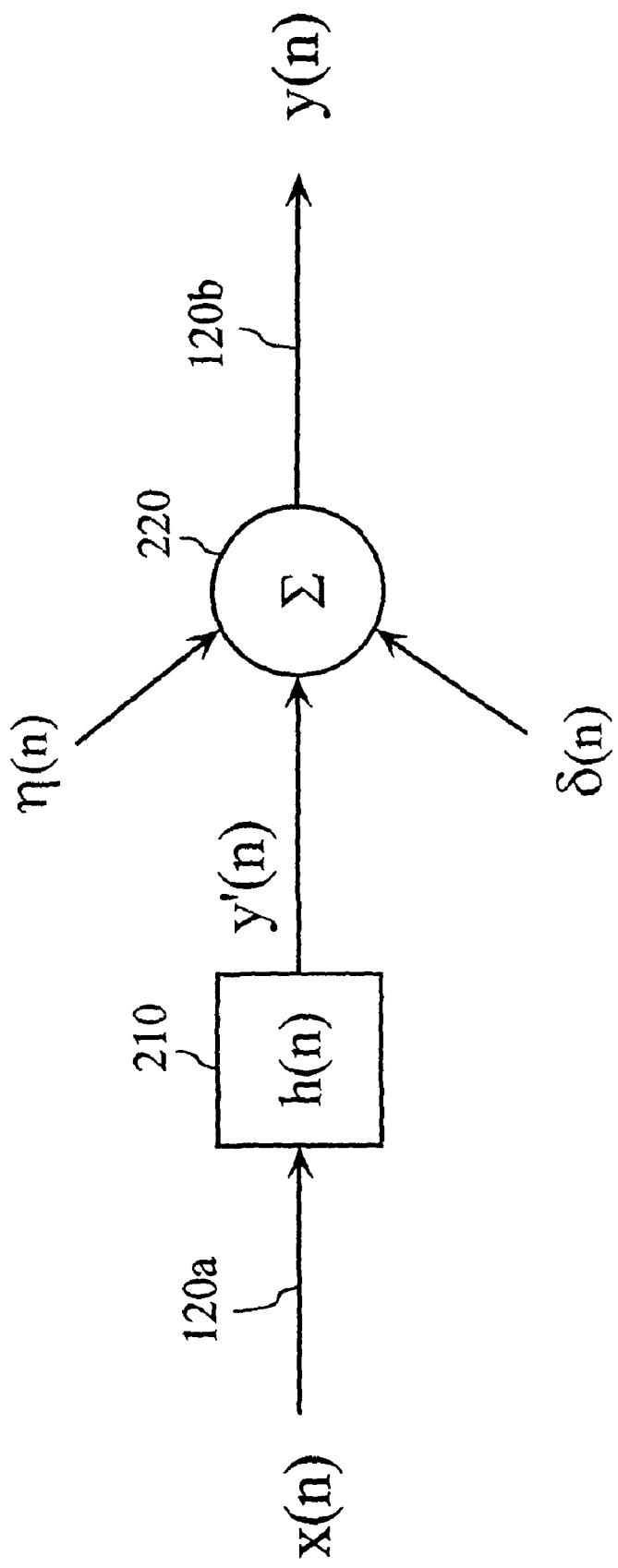
FIG. 2 is a functional representation of the communication channel of FIG. 1.

FIG. 2 is a functional model of the exemplary communication channel 120 of FIG. 1. As shown in FIG. 2, the exemplary communication channel 120 includes a transfer function 210 and a summing junction 220. In operation, a transmitted stream of digital symbols x(n) is fed to the transfer function 210 via link 120a. Accordingly, the transfer function 210 distorts the stream of digital symbols as a function of the physical make-up of the communication channel 120, thus causing, for example, multi-path distortion and delay according to Eq. (1) below:

$$y'(n)=x(n)*h(n) \quad (1)$$

where the distorted signal y'(n) is the convolution of the transmitted signal x(n) and the transfer function h(n).

The distorted signal y'(n) is then fed to the summing junction 210 where the distorted signal y'(n) is subjected to various noise, such as Gaussian noise and impulse noise, to produce a noisy and distorted signal y(n) according to Eq. (2) below:

$$y(n)=y'(n)+\eta(n)+\delta(n) \quad (2)$$

where η(n) is Gaussian noise contaminating the communication channel 120, and δ(n) is impulse noise contaminating the communication channel 120. As the transmitted communication signal x(n) is distorted and contaminated with noise, the resultant noisy, distorted signal y(n) can be fed to any number of receiving devices.

Figure 3:
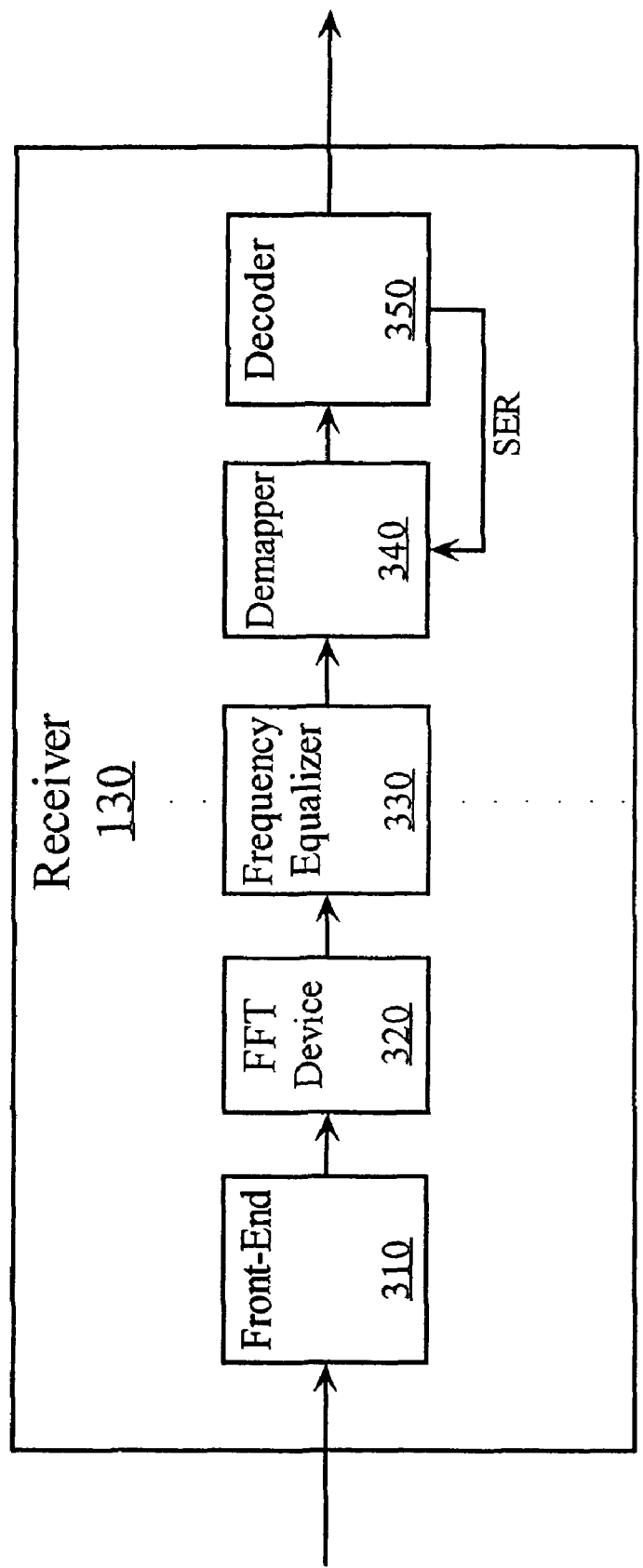
FIG. 3 is a block diagram of the exemplary receiver of FIG. 1.

FIG. 3 is a block diagram of the exemplary receiver 130 of FIG. 1. As shown in FIG. 3, the receiver 130 contains a front-end 310, an FFT device 320, a frequency equalizer 330, a demapper 340 and a decoder 350. While the exemplary receiver 130 is represented as a string of discrete devices 310-350, it should be appreciated that the receiver 130 can be implemented using any number of architectures, such as an architecture based on a microprocessor or digital signal processor, a number of fixed electronic circuits, a variety of programmable logic and the like without departing from the spirit and scope of the present invention.

In operation, the receiver 130 can receive a stream of symbols encoded and modulated according to the ADSL standard, noting that the received stream of symbols can be distorted and contaminated with noise. Once received, the receiver 130 can provide this distorted, noisy signal to the front-end 310. The front-end 310 in turn can receive the distorted, noisy signal and perform any number of processes on the received signal, such as filtering, electrical conditioning, amplification and analog-to-digital conversion, as well as any other operation that might be useful for a particular receiver using a particular communication standard. Once the front-end 310 has processed the received signal, the front-end 310 can provide the processed signal to the FFT device 320.

The FFT device 320 can receive the processed signal, and perform a real-to-complex Fast Fourier Transform on the processed signal. The FFT device can then feed the transformed signal to the frequency equalizer 330 such that the frequency equalizer 320 can perform an equalization process to compensate for the distortion caused by the transfer function h(n) of the communication channel 120. Assuming that the frequency equalizer 330 performs perfectly, the resultant equalized signal will be free of multi-path distortion, but will still be contaminated with Gaussian and/or impulse noise. As the frequency equalizer 330 equalizes the received signal, the frequency equalizer 330 feeds the equalized signal to the demapper 340.

The demapper 340 in turn can receive the equalized signal, which can be thought of as a stream of symbol estimates x'(n)≈x(n), and perform a detection process, i.e., associating symbol estimates with known decision points in a working constellation, while additionally marking various symbols as erasures when appropriate. After the stream of symbol estimates x'(n) is detected and appropriately marked, the stream of detected/marked symbols is provided to the decoder 350.

As the decoder 350 receives the stream of detected/marked symbols, the decoder 350 can perform an error detection/correction process according to the Reed-Solomon paradigm. After the decoder 350 has processed each block of symbols within the stream of detected/marked symbols, the decoder 350 can provide a stream of corrected symbols to an external device (not shown) and further provide information as to the symbol error rate (SER) back to the demapper 340.

Figure 4:
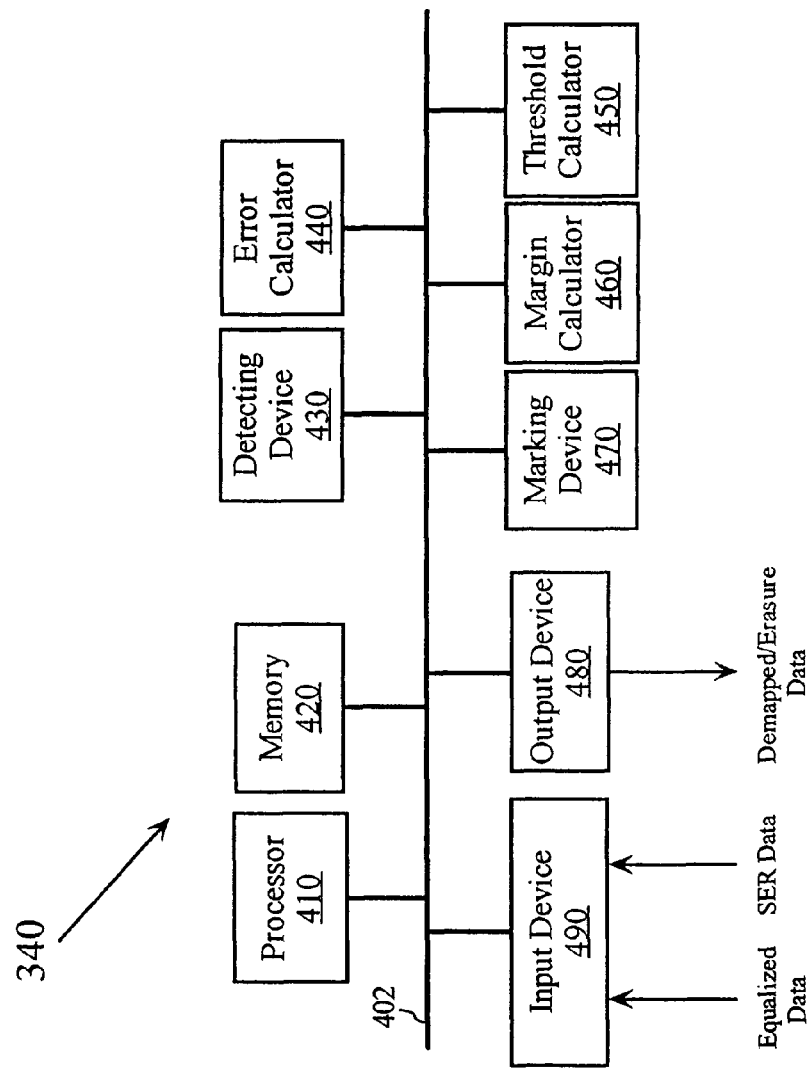
FIG. 4 is a block diagram of the exemplary demapper of FIG. 3.

FIG. 4 is a block diagram of the exemplary demapper 340 according to the present invention. As shown in FIG. 4, the exemplary demapper 340 includes a processor 410, a memory 420, a detection device 430, an error calculator 440, a threshold calculator 450, a margin calculator 460, a marking device 470, an output device 480 and an input device 490. The various components 410-490 of the demapper 340 are coupled together with an address/data bus 402. While the exemplary demapper 340 is represented in the context of a processor architecture having a number of attached special-function devices 430-470, it should be appreciated that these special-function devices 430-470 preferably take the form of software/firmware routines running from the memory 420. It should also be appreciated that the demapper 340 can otherwise be implemented using any number of configurations or architectures, such as an architecture based on a microprocessor or digital signal processor, a number of fixed electronic circuits, a variety of programmable logic and the like without departing from the spirit and scope of the present invention.

In operation, the input device 490 under control of the processor 410 can receive a communication signal containing a stream of symbol estimates, and provide the stream of symbol estimates to the memory 420 as well as the detection device 430.

Figure 5:
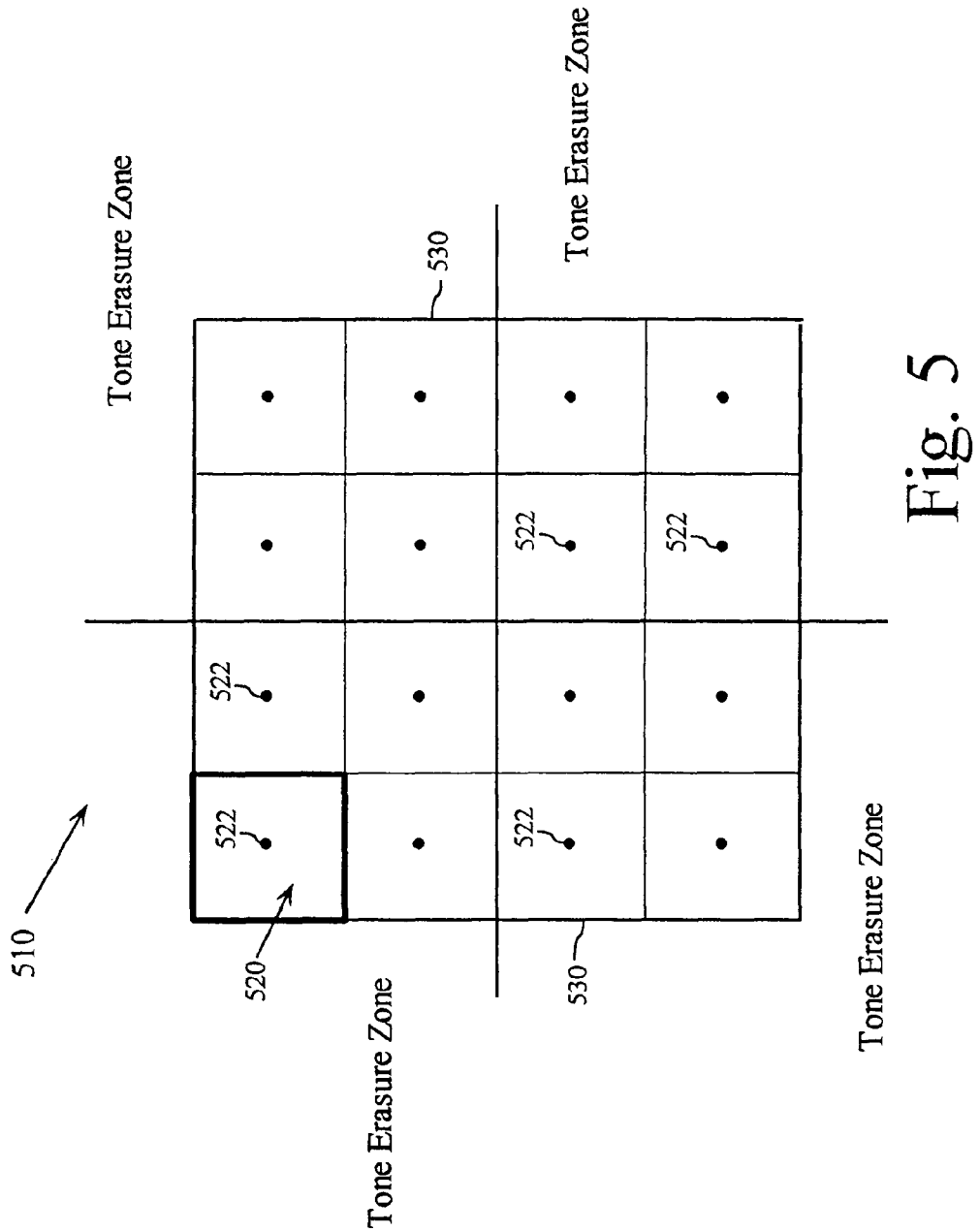
FIG. 5 depicts an exemplary sixteen point constellation of decision points for a QAM signal.

The detection device 430 can receive the stream of symbol estimates, and perform a detection process on each of the symbol estimates, i.e., assign a value to each symbol estimate by associating the symbol estimate with one symbol from a constellation of known symbols. The exemplary detection device 430 determines the value of a symbol estimate from the symbol decision points 522 in the constellation 510 shown in FIG. 5. That is, as the detection device 430 receives the stream of symbol estimates x'(n), the detection device 430 can determine which decision point 522 each (noisy, distorted) symbol estimate should be associated with based on where the symbol estimate falls on the constellation 510. That is, while an ideal (noiseless, undistorted) received symbol should always map symbol estimates exactly to one of the sixteen symbol decision points 522 of the constellation 510, practical receivers can only associate a symbol estimate with that symbol decision point closest to the symbol estimate. For example, if a symbol estimate falls within the top-leftmost decision area 520 of the constellation 510 of FIG. 5, then the detection device 430 will determine that that symbol estimate should be associated with the top-leftmost symbol decision point 522.

However, it should be appreciated that if a particular symbol estimate fails to fall within any decision area 520, but instead falls outside boundary 530 into the tone erasure zone, then the whole tone may be considered an erasure. Accordingly, if the detection device 430 determines that a symbol estimate falls in the tone erasure zone, then the detection device 430 can mark all relevant symbol estimates as erasures. After the detection device 430 has decided the value of each symbol estimate or determined that the whole tone is to be considered an erasure, the detection device 430 will appropriately provide a stream of detected signals with erasure markers (where appropriate) to the memory 420 and to the error calculator 440.

The error calculator 440 can receive the stream of detected signals with erasure markers, as well as receive the stream of symbol estimates from memory 420 and calculate any number of error profiles. Generally, an "error profile" can be any quantity based on the distance between a symbol estimate and a symbol decision point that can be used to gauge the likelihood that the symbol estimate was accurately decided and/or whether the symbol estimate is likely an erasure. That is, it should be appreciated that in various circumstances, a symbol estimate may be considered an erasure even if the symbol estimate falls within a particular decision area 520. This is because a received signal will occasionally suffer impulse noise that will "perturb" a symbol estimate, without necessarily displacing the symbol estimate into a tone erasure zone. Accordingly, it can be advantageous to detect and flag these types of symbol erasures as every detected erasure can improve the error correcting capacity of an RS block decoder.

Figure 6:
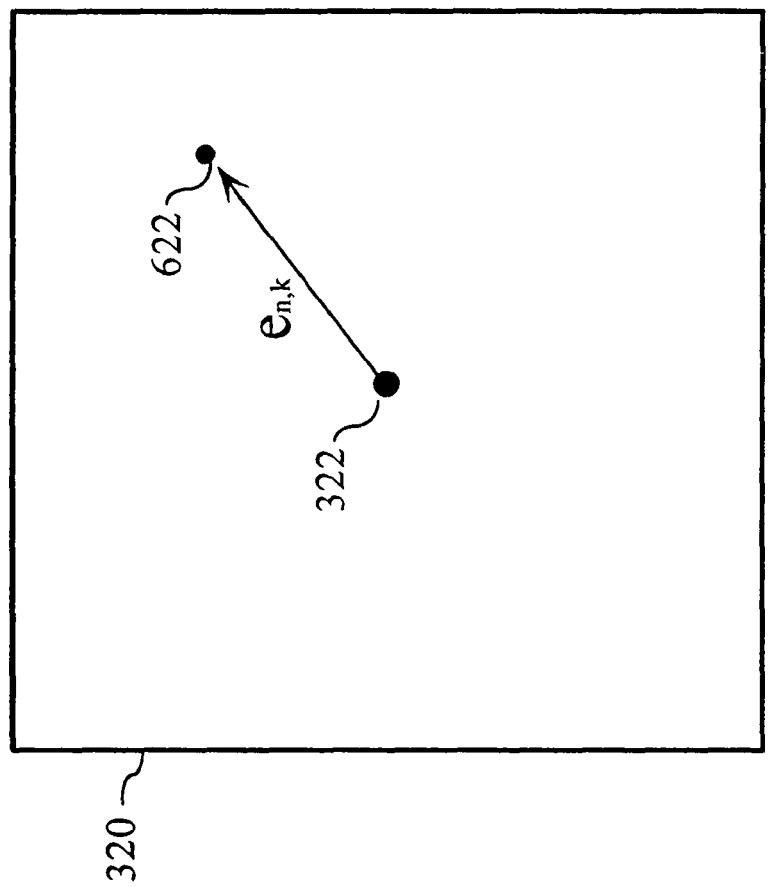
FIG. 6 depicts a distance/error value between a decision point and a symbol estimate.

To that end, the error calculator 440 can calculate any number of error profiles according to any known or later developed technique. For example, as demonstrated in FIG. 6, the error calculator 440 can simply determine the distance value $e_{n,k}$ between each decision point 322 and a symbol estimate 622 for each tone k and symbol n, and add the distance values, then normalize the sum. Alternatively, the error calculator 440 can determine an error profile based on a normalized sum of squared distance values.

Further, it should be appreciated that in other embodiments the error calculator 440 can use other techniques to calculate error profiles. For example, the error calculator 440 can in various embodiments employ a sum of weighted distances similar to that disclosed in "METHOD FOR DETECTING ERASURES IN RECEIVED DIGITAL DATA" to Spuyt (U.S. Pat. No. 5,636,253) herein incorporated by reference in its entirety. Still further, the error calculator 440 may employ an error metric generated from a specially-designed Viterbi device, or the error calculator 440 may employ any number of linear, non-linear, algorithmic or non-algorithmic approaches useful for deriving some form of error profile without departing from the spirit and scope of the present invention.

Regardless of the type of error profile used, once the error calculator 440 has determined an error profile for each received symbol estimate, the error calculator 440 can provide the error profiles to the marking device 470.

The working of the threshold calculator 450 is described hereinbelow. First, it should be appreciated that the noise of each symbol can be computed as the sum E of the square of normalized errors associated with each tone as shown in Eq. (3) below:

$$E = \frac{\sum_{i \in N} |e_i|^2}{(2^{-(24-b_i-(b_i \bmod 2))})} \quad (3)$$

where $e_i$ is an error for a tone i, $b_i$ is the number of bits on the tone i, and N is the total of all loaded tones used.

The goal of normalization is to normalize the variance of the noise to the size of the decision areas on a constellation. The normalized variance depends on a desired tone error probability, i.e., a tone error probability considered acceptable, and usually in ADSL communication systems, the tone error probability is a function of a requested noise margin.

As the statistical distribution of the distance/error values can be assumed Gaussian, the sum of squares E will have a $\chi^2$ (chi-squared) distribution with 2N degrees of freedom. When the threshold to detect a symbol erasure is set such that a false detection of an erasure is below $10^{-7}$, such a threshold can be calculated based on two parameters: the SER and the number of tones N. However, in operation, a particular SER can be initially assumed, and the erasure detector 420 can approximate an initial symbol erasure base-threshold $E_0$ based on a chi-squared model according to Eq. (4) below:

$$E_0 \approx k_1 + N^{0.5} k_2 + N k_3 \quad (4)$$

where $k_1$, $k_2$ and $k_3$ are parameters set according to the false detection of errored symbols and tone erasure probability. Once the initial symbol erasure base-threshold is calculated, the threshold calculator 450 can provide the initial symbol erasure base-threshold to the margin calculator 460.

The margin calculator 460 in turn can receive the initial symbol erasure base-threshold, determine an initial symbol erasure margin M and then calculate a modified symbol erasure threshold E(T) according to Eq. (5) below:

$$E(T) = \text{ThresholdBaseValue} \times \text{Margin} = E_0 \times 10^{-M/10} \quad (5)$$

Once a connection is established, it should be appreciated that there will likely be a lot of margin with regard to a worst case initial symbol erasure base-threshold value. That is, the symbol erasure base-threshold value that would provide the best results will generally be different than the initially calculated symbol erasure base-threshold.

One problem with previously known erasure detection techniques is that their threshold error rates are defined with 0 db margins. This results in an excessive number of burst errors that could be detected, but will not be flagged as an erasure. Accordingly, the desired margin M can take a range of values to address this problem. For example, in various embodiments, the margin M can be set to a fixed value, such as 6 db, which happens to coincide with the noise margin of most practical modems.

Figure 7B:
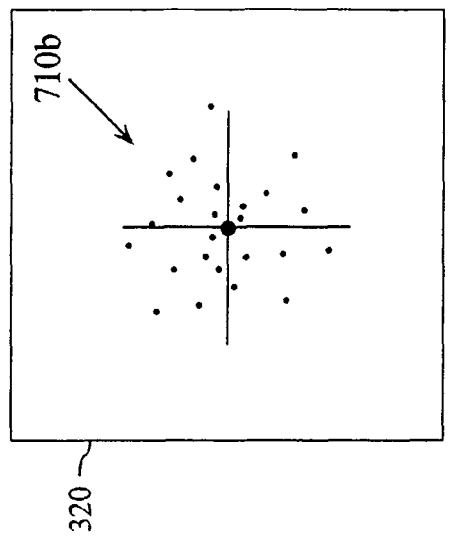
FIGS. 7a and 7b depict two exemplary distributions of symbol estimates about a symbol decision point.
Figure 7A:
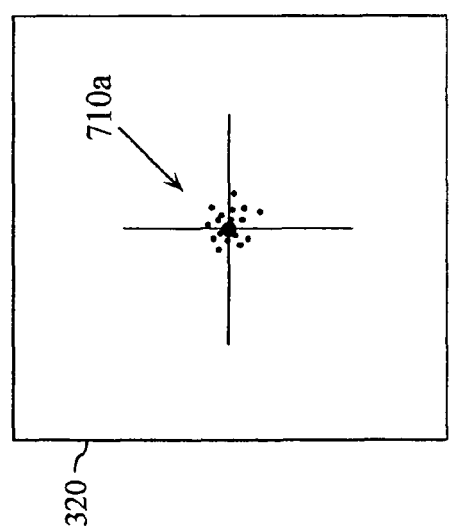

However, in other embodiments, the margin M can be advantageously calculated based on a signal-to-noise ratio (SNR) of the received signal. FIGS. 7a and 7b show two exemplary distributions 710a and 710b of symbol estimates about a symbol decision point. As shown in FIG. 7a, the distribution 710a of the symbol estimates about the decision point show a tight grouping due to a favorably high SNR. In contrast, the distribution 710b of FIG. 7b is relatively much wider than that of distribution 710a due to a relatively poor SNR.

Figure 8B:
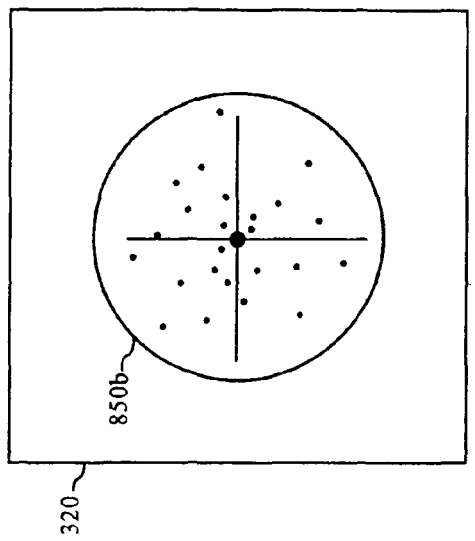
FIGS. 8a and 8b depict an exemplary difference between symbol erasure thresholds resulting from different signal-to-noise ratios.
Figure 8A:
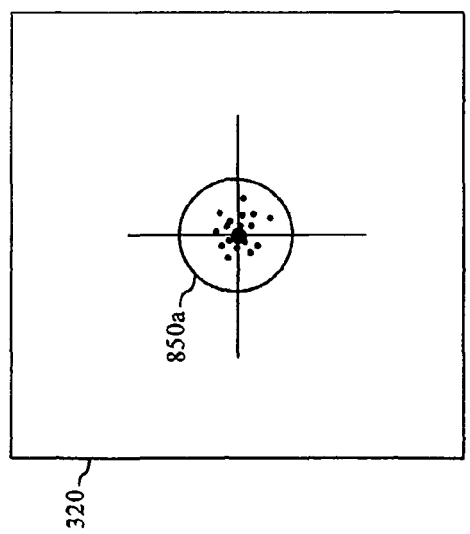

FIGS. 8a and 8b provide an exemplary difference between two symbol erasure thresholds 850a and 850b adjusted based on the distributions 710a and 710b of FIGS. 7a and 7b respectively. As shown in FIGS. 8a and 8b, communication signals having larger SNRs may benefit from having smaller overall thresholds, while signals having smaller SNRs may require much greater thresholds to avoid accidental mischaracterization of good symbols as erasures.

Returning to FIG. 4, once the margin calculator 460 has modified the initial symbol erasure threshold, the margin calculator 460 can provide the modified symbol erasure threshold to the marking device 470.

The marking device 470, having received a modified symbol erasure threshold and a stream of error profiles for respective determined symbols, can then compare each error profile against the modified symbol erasure threshold, and mark those symbols as erasures whenever the respective error profile exceeds the threshold. As the various symbols are appropriately compared and marked, the marking device 470 can feed the marked-up symbols to an external device via the output device 480.

While the threshold calculator 450 and margin calculator 460 together provide the novel advantage described above, it should be appreciated that the threshold calculator 450 and margin calculator 460 can in various embodiments additionally update their respective threshold and margin values over time in an adaptive fashion.

For example, in a first set of embodiments, the threshold calculator 450 can periodically receive various measured SER data, including false detection of errored symbols data and tone erasure probability data, from the decoder 350 of FIG. 3. Accordingly, the threshold calculator 450 can modify the symbol erasure base-threshold based on the measured SER.

Similarly, the margin calculator 460 can periodically determine the SNR (or other error quantity) of a received signal by, e.g., direct observation of symbol estimates, using an error profile or receiving SNR data from another device associated with the receiver 130. The margin calculator 460 can then determine a more appropriate margin M based on the SNR data and recalculate the modified symbol erasure threshold E(T) using Eq. (5) above. The modification of one or both of the threshold and margin can accordingly continue as necessary. Such modifications can be performed at predetermined intervals or for example in response to detected changes in the SER or SNR.

Figure 9:
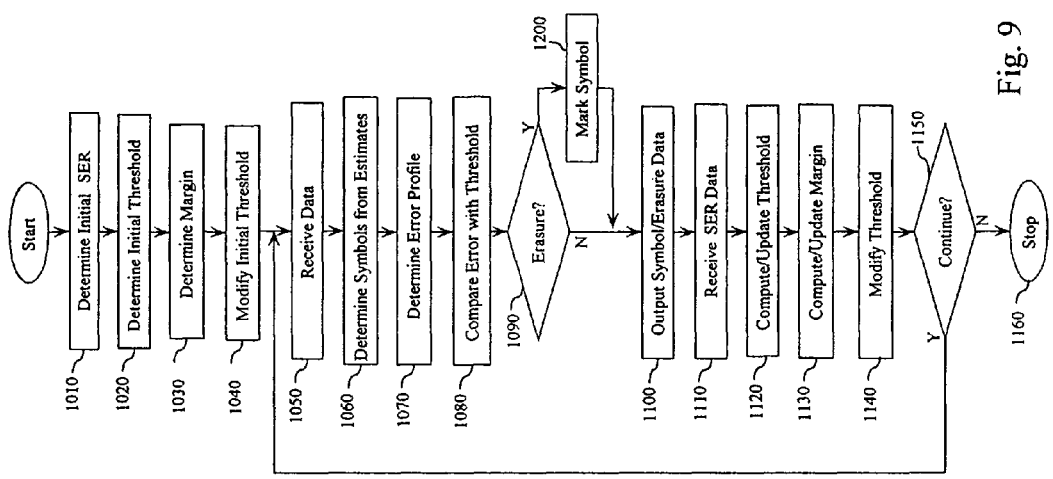
FIG. 9 is a flowchart outlining a exemplary operation for generating thresholds and detecting symbol erasures according to the present invention.

FIG. 9 is a flowchart outlining an exemplary operation for adaptively calculating a symbol erasure base-threshold and margin, and for detecting symbol erasures according to the present invention. The process starts in step 1010 where an initial SER is determined. As discussed above, the initial SER can be assumed to be a particular value, or the SER can be derived from measured signals. The process continues to step 1020.

In step 1020, an initial symbol erasure base-threshold is determined as described above based upon the SER of step 1010 and the number of tones of a received signal. Next, in step 1030, a symbol erasure margin is determined. As discussed above, the symbol erasure margin can be set to a fixed value, or otherwise determined according to some error quantity associated with a received communication signal, such as an SNR. Then, in step 1040, a modified symbol erasure threshold is calculated based, for example, on Eq. (5) above using the initial symbol erasure base-threshold of step 1020 and the margin of step 1030. The process continues to step 1050.

In step 1050, a stream of symbol estimates is received. Next, in step 1060, the symbol estimates are associated with various known, valid symbols by associating the symbol estimates with the closest symbol decision point in a relevant symbol constellation. Then, in step 1070, a stream of error profiles is generated from the stream of received symbol estimates. The process continues to step 1080.

In step 1080, the various error profiles are compared with the modified symbol erasure threshold of step 1040. Then, in step 1090, a determination is made for each symbol as to whether the symbol is an erasure based on the comparison of step 1080. If a particular symbol is determined to be an erasure, the process jumps to step 1200; otherwise, the process continues to step 1100.

In step 1200, each symbol determined to be an erasure is appropriately marked, and the process continues to step 1100.

In step 1100, the marked symbol/erasure data is exported to an external device, such as an RS decoder. Next, in step 1110, SER data is received from an external device, such as the RS decoder of step 1100. The process continues to step 1120.

In step 1120, the symbol erasure base-threshold is updated based on an error quantity, such as the SER data of step 1110. Next, in step 1130, the symbol erasure margin is updated based on an error quantity, such as the SNR of the received communication signal. Then, in step 1140, the modified symbol erasure threshold is calculated based on the updated base-threshold and margin. The process continues to step 1150.

In step 1150, a determination is made as to whether to continue to detect symbol erasures. If erasure detection is to continue, the process jumps back to step 1150; otherwise, control continues to step 980 where the process stops.

It should be appreciated that the various above-described systems and methods are preferably implemented on a digital signal processor (DSP) or other integrated circuits. However, the systems and methods can also be implemented using any combination of one or more general purpose computers, special purpose computers, programmable microprocessors or microcontrollers and peripheral integrated circuit elements, hardware electronic or logic circuits, such as application specific integrated circuits (ASICs), discrete element circuits, programmable logic devices, such as a PLD, PLA, FPGA, or PAL or the like. In general, any device on which exists a finite state machine capable of implementing the various elements of FIGS. 1-4 and/or the flowcharts of FIG. 9 can be used to implement the receiver functions.

In various embodiments where the above-described systems and/or methods are implemented using a programmable device, such as a computer-based system or programmable logic, it should be appreciated that the above-described systems and methods can be described by any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device to implement one or more of the above-described systems and/or methods. Once an appropriately capable device has access to the information contained on the storage media, the storage media can provide the information to the device, thus enabling the device to perform the above-described systems and/or methods.

For example, if a computer disk containing the appropriate information, such as a source file, an object file, an executable file or the like, were provided to a DSP, the DSP could receive the information, appropriately configure itself and perform the functions of the various elements of FIGS. 1-4 and/or the flowchart of FIG. 9 to implement the receiver 130 functions. For example, the DSP could receive various portions of information from the disk relating to different elements of the above-described systems and/or methods, implement the individual systems and/or methods and coordinate the functions of the individual systems and/or methods to determine symbol erasure thresholds and mark symbol erasures.

In still other embodiments, rather than providing a fixed storage media, such as a magnetic-disk, information describing the above-described systems and methods can be provided using a communication system, such as a network or dedicated communication conduit. Accordingly, it should be appreciated that various programs, executable files or other information embodying the above-described systems and methods can be downloaded to a programmable device using any known or later developed communication technique.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A method for determining a symbol erasure threshold for a received signal, comprising:
    (a) determining a symbol erasure base-threshold;
    (b) determining a symbol erasure margin;
    (c) determining the symbol erasure threshold for the received signal based on the symbol erasure base-threshold and the symbol erasure margin; and
    (d) adaptively updating the symbol erasure threshold based on the received signal.

2. The method of claim 1, wherein step (a) comprises:
    calculating an initial symbol erasure base-threshold based on an assumed value.

3. The method of claim 1, wherein step (d) comprises adaptively updating the symbol erasure base-threshold based on the received signal to determine an updated symbol erasure base-threshold.

4. The method of claim 3, wherein step (d) further comprises adaptively updating the symbol erasure base-threshold based on a symbol error rate (SER) of the received signal.

5. The method of claim 3, wherein step (d) further comprises adaptively updating the symbol erasure threshold based on the updated symbol erasure base-threshold.

6. The method of claim 1, wherein step (d) comprises adaptively updating the symbol erasure margin based on the received signal to determine an updated symbol erasure margin.

7. The method of claim 6, wherein step (d) further comprises adaptively updating the symbol erasure threshold based on the updated symbol erasure margin.

8. The method of claim 6, wherein the updating the symbol erasure margin is based on a signal-to-noise ratio of the received signal.

9. The method of claim 1, wherein step (b) comprises setting the symbol erasure margin to a predetermined value.

10. The method of claim 1, wherein step (d) comprises determining a symbol error rate (SER) based on the received signal.

11. A method for detecting a symbol erasure in a received signal, comprising:
    (a) determining a symbol erasure threshold, comprising:
        (1) determining a symbol erasure base-threshold;
        (2) determining a symbol erasure margin; and
        (3) determining the symbol erasure threshold based on the symbol erasure base-threshold and the symbol erasure margin;
    (b) associating a symbol estimate of the received signal with a symbol decision point;
    (c) generating an error profile for the symbol estimate;
    (d) comparing the error profile with the symbol erasure threshold;
    (e) adaptively updating the symbol erasure threshold based on the received signal.

12. The method of claim 11, wherein step (b) further comprises:
    determining a symbol based on the associated symbol decision point.

13. The method of claim 12, further comprising:
    (f) marking the symbol as an erasure based on the comparison of step (d).

14. The method of claim 11, wherein step (e) comprises
    determining an updated symbol erasure margin based on the received signal, and
    determining an updated symbol erasure threshold based on the updated symbol erasure margin.

15. The method of claim 14, wherein step (e) further comprises determining the updated symbol erasure margin based on a signal to noise ratio (SNR) of the received signal.

16. The method of claim 11, wherein step (e) comprises
    determining an updated symbol erasure base-threshold based on the received signal, and
    determining an updated symbol erasure threshold based on the updated symbol erasure base-threshold.

17. The method of claim 16, wherein step (e) further comprises determining the updated symbol erasure base-threshold based on a symbol error rate (SER) of the received signal.

18. A system for adaptively determining a symbol erasure threshold for a received signal, comprising:
    a base-threshold means for adaptively determining a symbol erasure base-threshold based on the received signal; and
    a threshold means for adaptively determining the symbol erasure threshold for the received signal based on the symbol erasure base-threshold and a symbol erasure margin.

19. The system of claim 18, further comprising:
a symbol error rate means for determining a symbol error rate (SER) based on the received signal.

20. The system of claim 19, wherein the base-threshold determining means is configured to adaptively update a previous symbol erasure base-threshold based on the SER.

21. The system of claim 18, further comprising an erasure margin means for adaptively determining the symbol erasure margin based on the received signal.

22. The system of claim 18, wherein the threshold means is configured to update a previous symbol erasure threshold.

23. A system for detecting symbol erasures, comprising:
a subsystem for adaptively determining a symbol erasure threshold for a received signal, comprising:
a base-threshold means for adaptively determining a symbol erasure base-threshold based on the received signal;
an erasure margin means for adaptively determining a symbol erasure margin based on the received signal; and
a threshold means for adaptively determining the symbol erasure threshold based on the symbol erasure base-threshold and the symbol erasure margin; and
an associating means for associating a symbol estimate with a symbol decision point;
an error profile generator means for generating an error profile for the symbol estimate; and
a comparison means for comparing the error profile with the symbol erasure threshold.

24. The system of claim 23, wherein the associating means determines a symbol based on the association of the symbol estimate with the symbol decision point.

25. The system of claim 24, further comprising:
a marking means for marking the symbol as an erasure based on the comparison of the error profile with the symbol erasure profile.

* * * * *